UNITED STATES PATENT OFFICE.

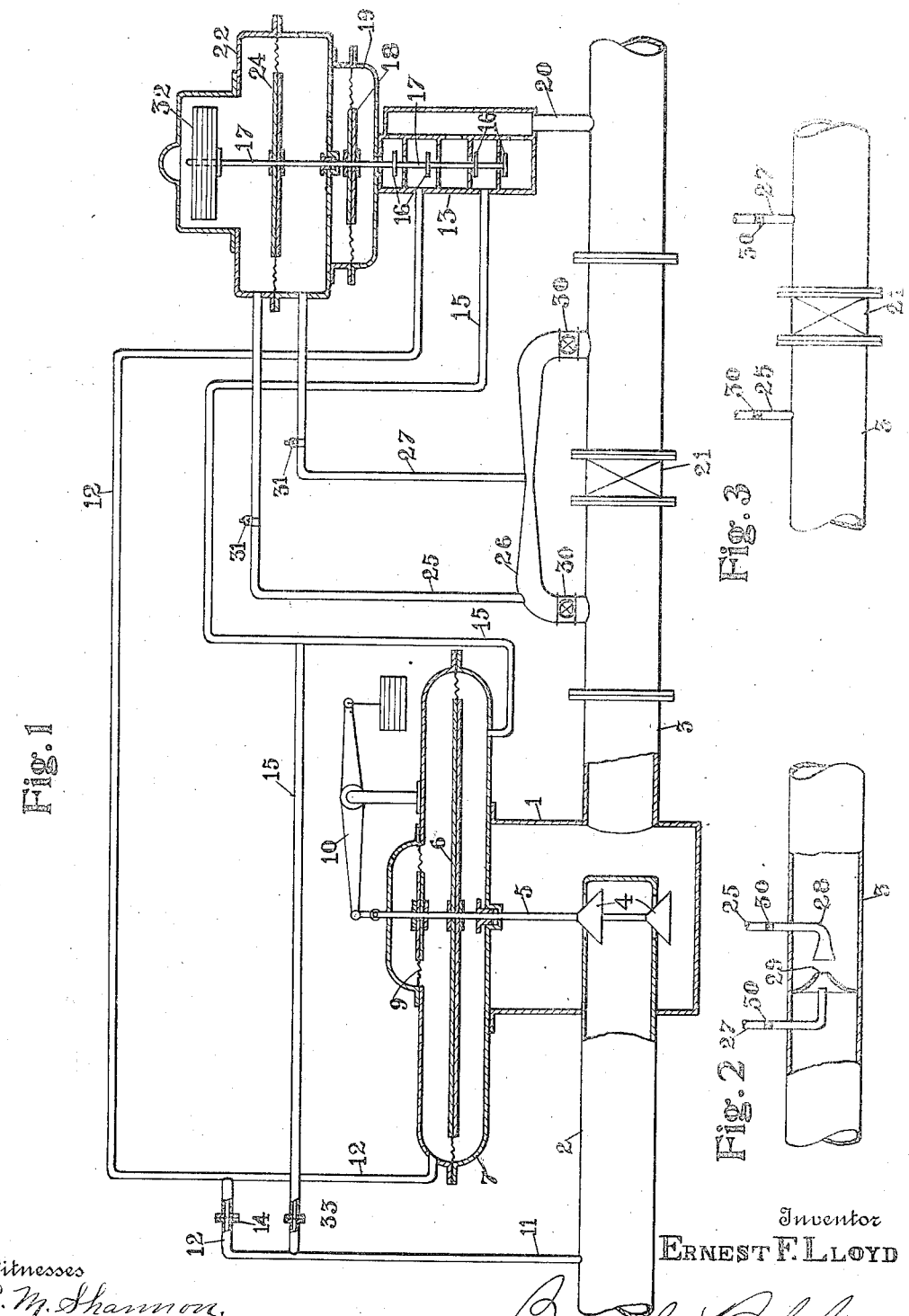

ERNEST F. LLOYD, OF DETROIT, MICHIGAN.

PRESSURE-INCREASER.

1,014,830.  Specification of Letters Patent.  Patented Jan. 16, 1912.

Application filed January 31, 1910. Serial No. 540,945.

*To all whom it may concern:*

Be it known that I, ERNEST F. LLOYD, a citizen of the United States of America, residing at Detroit, in the county of Wayne and State of Michigan, have invented certain new and useful Improvements in Pressure-Increasers, of which the following is a specification, reference being had therein to the accompanying drawings.

This invention relates to a pressure increaser or means automatically controlling the flow of gas or the like through a main or conduit whereby the pressure at a given point in the main is built up as the volume of gas passing the point increases.

The invention consists in the matters hereinafter set forth, and more particularly pointed out in the appended claims.

In the drawings, Figure 1 is a view, largely diagrammatic, of an apparatus embodying features of the invention; and Figs. 2 and 3 are views in detail of modifications of parts thereof.

Referring to the drawings, a main or conduit has an automatic regulating valve 1 that controls the flow from the inlet arm 2 of the main to the outlet arm 3 thereof, arranged to hold the pressure in the outlet arm 3 at a constant point in relation to atmospheric pressure. The pressure in the inlet arm 2 is greater than that in the outlet 3.

In preferred form the regulating valve has closures 4 operatively connected by a stem 5 to a main diaphragm 6 that divides a pressure drum 7 into an upper and lower compartment. The effective area of the upper side of the diaphragm is balanced in part by a countervailing diaphragm 9 and any preferred form of counterbalancing device indicated at 10 is used to take care of the weight of the parts. A pressure pipe 11 from the inlet 2 has an upper branch 12 one arm of which opens into the upper compartment of the drum 7 and the other arm into one chamber of a master valve casing 13. A restriction in the form of an apertured diaphragm 14 or the like impedes the flow into the branch 12. A lower branch 15 from the pressure pipe 11 opens into the lower compartment of the drum 7 and into a second chamber in the casing 13, a second restriction 33 being placed in the said branch.

Closures 16 in the master valve casing are moved by a stem 17 and diaphragm 18 in a drum 19. The casing is in communication with the outlet through a discharge pipe 20 and the diaphragm 18 whose upper side is exposed to atmospheric pressure rises and falls in response to fluctuations in pressure in the outlet arm 3 so that when the pressure increases the main diaphragm 6 is raised by the increased pressure in the lower part of the drum 7 due to the cutting off of the outlet of the lower branch 15, thereby partially closing the regulating valve. Opposite conditions produce opposite results in a familiar manner so that the pressure in the outlet arm 3 is practically constant.

It will be understood that the closures of the master valve are weighted as indicated at 32 and the amount of this weight determines the range of action of the governor.

In order that the regulator may allow the pressure to increase as the volume of gas passing the outlet increases, means are employed to cause a drop in pressure in the outlet arm as by a valve 21 which may be opened and closed by an operator. A loading drum 22 is mounted on the drum 19 and is divided into two closed compartments by a loading diaphragm 24 or like movable member that is operatively connected to the stem 17. The upper compartment of the drum is connected by a pipe 25 to the outlet arm 3 on the pressure side of the valve 21 either directly as indicated in Fig. 3, or through the intake arm of a Venturi tube 26 inserted as by a by-pass around the valve 21. A second pipe 27 leads from the lower compartment of the drum 23 either directly into the outlet 3 on the exhaust side of the valve 21 or into the throat of the Venturi tube 26 as in Fig. 1. The Venturi tube may be replaced by a Pitot tube 28 as indicated in Fig. 2 with means shown diagrammatically at 29 for increasing the effect of the velocity of flow. If the Pitot or Venturi tubes are not used the diaphragm 24 must be of a very large area in order to be suitably affected by the differences in pressure set up by the valve 21. To avoid this undesirable construction, the Pitot tube or Venturi is used, the latter especially multiplying the effect of the differential pressure several times after the well known law of flow therethrough. By this arrangement of parts an increase in flow through the outlet arm 3, which means an increase of volume of gas passing the pipe 20, causes increase in differences in pressure around the valve 21, the latter having been partially closed by the operator to set up a predetermined differential under a predetermined flow. As a consequence the pressures on the opposite sides of the diaphragm 24 become unequal and increase the effect of the weight and the atmospheric pressure, or, in other words, increase the effect of the constant load on the stem 17. This tends to so hold the master valve that the regulating valve remains more open than it otherwise would thereby building up the pressure in the outlet 3.

Suitable cut off valves 30 may be used to disconnect the increaser, vents 31 in the pipes 25 and 27 being likewise opened so that there is no impedance to the motion of the diaphragm 24 occasioned by the fluctuations of the master valve diaphragm 18.

As above stated the use of the Venturi and Pitot tube is not necessary, but is a convenient method of multiplying the effect of the differences in pressure on the diaphragm 24 against the action of the diaphragm 18 and takes the place of increasing the area of the diaphragm 24 which would make the apparatus very bulky.

Obviously, changes in details of construction may be made without departing from the spirit of the invention, and I do not limit myself to any particular form or arrangement of parts.

What I claim as my invention is:—

1. The combination with a conduit of regulating means for automatically maintaining a constant pressure in the conduit on the outlet side of the regulator, means for causing a local drop in pressure at a point in the outlet side of the conduit, and a reciprocable member that is operated by variations in the difference between the pressures on the opposite sides of the point and is adapted when so operated to coact with the regulator to vary the pressure in the outlet side of the conduit as the volume of flow past said point varies.

2. The combination with a conduit of regulating means for automatically maintaining a constant pressure in the conduit on the outlet side of the regulator, means for causing a local drop in pressure at a point in the outlet side of the conduit, a reciprocable member that is operated by variations in the difference between the pressures on the opposite sides of the point and is adapted when so operated to coact with the regulator to vary the pressure in the outlet side of the conduit as the volume of flow past said point varies, and means between the conduit and member for multiplying the effect of the differential pressure thereon.

3. The combination with a conduit of regulating means for automatically maintaining a constant pressure in the conduit on the outlet side of the regulator, means for causing a local drop in pressure at a point in the outlet side of the conduit, a reciprocable member that is operated by variations in the difference between the pressures on the opposite sides of the point and is adapted when so operated to coact with the regulator to vary the pressure in the outlet side of the conduit as the volume of flow past said point varies, and a Venturi tube for multiplying the effect of the differential pressure on the member.

4. The combination with a conduit of a regulating valve therein, means actuated by fluid under pressure and adapted to operate the regulating valve, a master valve that is operated by variations in pressure in the conduit on the outlet side of the regulating valve and is adapted to direct flow from the conduit on the inlet side of the regulating valve to the operating means of the latter, to open the regulating valve when the pressure in the conduit on the outlet side falls and to close it when said pressure rises, means for causing a local drop in pressure at a point in the conduit on the outlet side of the regulating valve, and means operated by variations in the difference between pressures on opposite sides of said point and adapted to so control the master valve that the pressure in the outlet side of the conduit increases as the volume of flow past said point increases.

5. The combination with a conduit of a regulating valve therein, means actuated by fluid under pressure and adapted to operate the regulating valve, a master valve that is operated by variations in pressure in the conduit on the outlet side of the regulating valve and is adapted to direct flow from the conduit on the inlet side of the regulating valve to the operating means of the latter, to open the regulating valve when the pressure in the conduit on the outlet side falls and to close it when said pressure rises, means for causing a local drop in pressure at a point in the conduit on the outlet side of the regulating valve, means operated by variations in the difference between pressures on opposite sides of said point and adapted to so control the master valve that the pressure in the outlet side of the conduit increases as the volume of flow past said point increases, and means for multiplying the effect of the differential pressure on the master valve controlling means.

6. The combination with a conduit of a pressure operated regulating valve therein, a pressure operated master valve for controlling the regulating valve to obtain a constant pressure in the conduit on the outlet side of the regulating valve, an adjustably variable restriction in the outlet side of the conduit that causes a local drop in pressure at a point therein, a diaphragm operated by variations in the difference between the pressures on the opposite sides of the said point and adapted to coact with the master valve upon the regulating valve to open the latter as the volume of flow past said point increases, and a Venturi tube operatively connected to the conduit where the local drop occurs and adapted to augment the effect of the differential pressure there upon the said diaphragm.

In testimony whereof I affix my signature in presence of two witnesses.

ERNEST F. LLOYD.

Witnesses:
 ANNA M. DORR,
 ANNA M. SHANNON.